US011901672B2

(12) United States Patent
Li et al.

(10) Patent No.: US 11,901,672 B2
(45) Date of Patent: Feb. 13, 2024

(54) ELECTRICAL CONNECTOR, CONNECTOR ASSEMBLY AND METHOD FOR MANUFACTURING ELECTRICAL CONNECTOR

(71) Applicant: Tyco Electronics (Shanghai) Co. Ltd., Shanghai (CN)

(72) Inventors: Xinlei (Tony) Li, Shanghai (CN); Fengping (Alex) Xu, Shanghai (CN); Qiaoli (Cherie) Chen, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 100 days.

(21) Appl. No.: 17/574,237

(22) Filed: Jan. 12, 2022

(65) Prior Publication Data

US 2022/0224053 A1 Jul. 14, 2022

(30) Foreign Application Priority Data

Jan. 13, 2021 (CN) ......................... 202110045442.8

(51) Int. Cl.
*H01R 13/6471* (2011.01)
*H01R 13/24* (2006.01)

(52) U.S. Cl.
CPC ......... *H01R 13/6471* (2013.01); *H01R 13/24* (2013.01)

(58) Field of Classification Search
CPC .... H05K 3/368; H01R 13/24; H01R 13/6471; H01R 13/6599; H01R 13/6597; H01R 13/6588; H01R 12/712; H01R 12/714; H01R 12/716; H01R 12/735; H01R 12/732
USPC ............................... 439/931, 607.12, 607.05
See application file for complete search history.

(56) References Cited

U.S. PATENT DOCUMENTS

| | | | | |
|---|---|---|---|---|
| 6,579,124 | B1 * | 6/2003 | Vanbesien ............ | H01R 12/727 439/607.05 |
| 8,002,581 | B1 * | 8/2011 | Whiteman, Jr. ... | H01R 13/6589 439/607.18 |
| 8,083,526 | B2 * | 12/2011 | Long .................... | H01R 12/721 439/60 |
| 8,525,635 | B2 * | 9/2013 | Navarro ................. | H01C 1/142 338/22 R |
| 8,535,065 | B2 * | 9/2013 | Costello ................. | H01R 31/06 439/82 |
| 8,888,531 | B2 * | 11/2014 | Jeon ..................... | H01R 13/658 439/607.07 |
| 9,356,401 | B1 * | 5/2016 | Horning ............. | H01R 13/6587 |

(Continued)

*Primary Examiner* — Marcus E Harcum
(74) *Attorney, Agent, or Firm* — Barley Snyder

(57) ABSTRACT

An electrical connector includes an insulation base, a plurality of grounding terminals mounted in the insulation base and a plurality of differential signal terminal pairs mounted in the insulation base. The plurality of grounding terminals and the plurality of differential signal terminal pairs are arranged into a plurality of terminal rows. Each of the plurality of differential signal terminal pairs is located between two adjacent grounding terminals in one terminal row and between two other grounding terminals of two terminal rows adjacent to the one terminal row. The insulation base is provided with an electrical connection layer by which at least two of the plurality of grounding terminals are electrically connected to each other.

20 Claims, 15 Drawing Sheets

(56) References Cited

U.S. PATENT DOCUMENTS

| | | | | |
|---|---|---|---|---|
| 9,373,917 | B2 * | 6/2016 | Sypolt | H01R 13/6585 |
| 9,472,887 | B1 * | 10/2016 | Horning | H01R 13/6471 |
| 9,666,961 | B2 * | 5/2017 | Horning | H01R 13/6599 |
| 9,666,998 | B1 * | 5/2017 | de Boer | H01R 13/6596 |
| 10,135,199 | B1 * | 11/2018 | Ju | H01R 12/7082 |
| 10,790,618 | B2 * | 9/2020 | Munoz | H01R 12/73 |
| 11,108,194 | B2 * | 8/2021 | Lin | H01R 13/6471 |
| 11,444,398 | B2 * | 9/2022 | Stokoe | H01R 12/716 |
| 2007/0021000 | A1 * | 1/2007 | Laurx | H01R 13/518<br>439/607.05 |
| 2013/0102192 | A1 * | 4/2013 | Davis | H01R 13/6581<br>439/607.07 |
| 2018/0261960 | A1 * | 9/2018 | Miyamura | H01R 13/6581 |
| 2018/0375262 | A1 * | 12/2018 | Ju | H01R 12/57 |
| 2019/0020155 | A1 * | 1/2019 | Trout | H01R 13/6587 |
| 2019/0131746 | A1 * | 5/2019 | Morgan | H01R 13/6584 |
| 2021/0234315 | A1 * | 7/2021 | Ellison | H01R 13/6477 |
| 2022/0094116 | A1 * | 3/2022 | Lin | H01R 13/6597 |

* cited by examiner

ELECTRICAL CONNECTOR, CONNECTOR ASSEMBLY AND METHOD FOR MANUFACTURING ELECTRICAL CONNECTOR

CROSS-REFERENCE TO RELATED APPLICATIONS

This application claims the benefit of Chinese Patent Application No. 202110045442.8 filed on Jan. 13, 2021 in the China National Intellectual Property Administration, the whole disclosure of which is incorporated herein by reference.

FIELD OF THE INVENTION

The present disclosure relates to an electrical connector, and in particular, to an electrical connector suitable for high-speed signal transmission, a connector assembly, and a method for manufacturing the electrical connector.

BACKGROUND

In recent years, with the development of digital information technology, data transmission rates have increased rapidly. For example, in the field of communication technology, a high-speed connector is required to achieve high-speed signal transmission of at least 112 Gbps. As an electrical connector is required to connect with different interfaces in data transmission, a signal transmission speed and quality of the electrical connector will greatly affect the speed and stability of the data transmission. In one application, an electrical connector may be used to electrically connect two printed circuit boards (PCBs).

Generally, an electrical connector suitable for the high-speed signal transmission mainly includes a base made of an insulation material and a plurality of terminal rows mounted in the base. Grounding terminals and differential signal terminal pairs are alternately arranged in each terminal row. Further, in adjacent terminal rows, the grounding terminal is positioned to correspond to the differential signal terminal pair so that a separate grounding shield is formed for each of the differential signal terminal pairs. In such electrical connector, in order to take into account high-speed performance and high-density requirement of the electrical connector, some of the differential signal terminal pairs and the grounding terminals are arranged in a staggered manner. However, as high-frequency performance is very sensitive to manufacturing tolerances of the terminals, the terminals must be manufactured to a high degree of accuracy by conventional technology, which increases the manufacturing difficulty and cost. In addition, crosstalk may be generated between the differential signal terminal pair located in one terminal row and the differential signal terminal pair located in an adjacent terminal row. In order to reduce this crosstalk, an interval between the terminal rows is generally set to be relatively large, which will reduce a density of transmission channels.

Improved electrical connectors addressing the above shortcomings are desired.

SUMMARY

According to an embodiment of the present disclosure, an electrical connector includes an insulation base, a plurality of grounding terminals mounted in the insulation base and a plurality of differential signal terminal pairs mounted in the insulation base. The plurality of grounding terminals and the plurality of differential signal terminal pairs are arranged into a plurality of terminal rows. Each of the plurality of differential signal terminal pairs is located between two adjacent grounding terminals in one terminal row and between two other grounding terminals of two terminal rows adjacent to the one terminal row. The insulation base is provided with an electrical connection layer by which at least two of the plurality of grounding terminals are electrically connected to each other.

BRIEF DESCRIPTION OF THE DRAWINGS

The invention will now be described by way of example with reference to the accompanying Figures, of which.

DETAILED DESCRIPTION OF THE EMBODIMENTS

Figure 1:
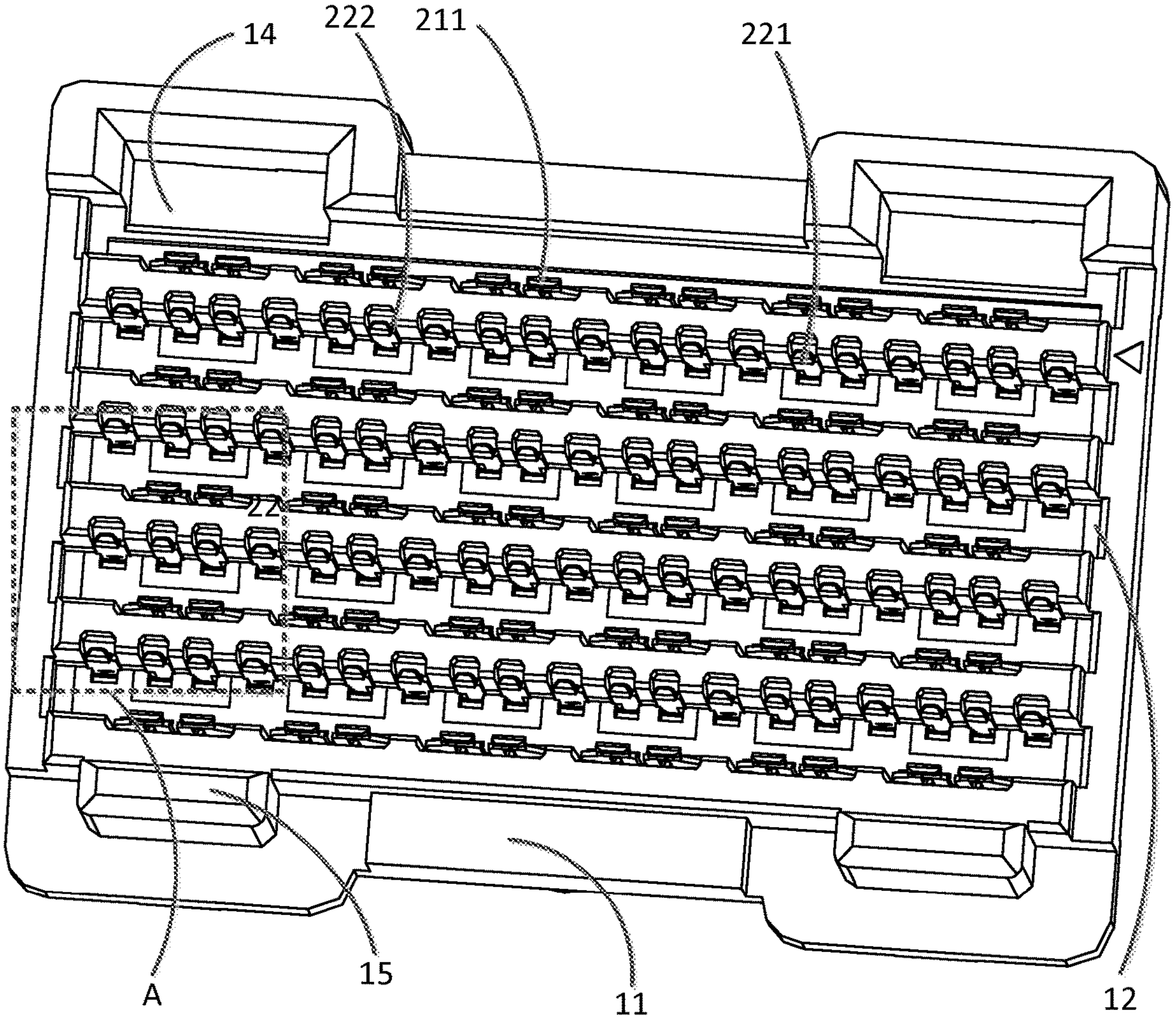
FIG. 1 shows a schematic perspective view of an electrical connector according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, an electrical connector includes an insulation base, a plurality of grounding terminals mounted in the insulation base and a plurality of differential signal terminal pairs mounted in the insulation base. The plurality of grounding terminals and the plurality of differential signal terminal pairs are arranged into a plurality of terminal rows. Each of the plurality of differential signal terminal pairs is located between two adjacent grounding terminals in one terminal row and between two other grounding terminals of two terminal rows adjacent to the one terminal row. The insulation base is provided with an electrical connection layer by which at least two ones of the plurality of grounding terminals are electrically connected to each other.

According to another embodiment of the present disclosure, a method for manufacturing the electrical connector includes the steps of forming an insulation base and forming a metallization layer on a surface of the insulation base. The method further includes the steps of laying a conductive layer on the metallization layer, and mounting a plurality of grounding terminals in the insulation base, respectively, such that at least two grounding terminals of the plurality of grounding terminals are electrically connected to each other by the conductive layer.

Figure 2:
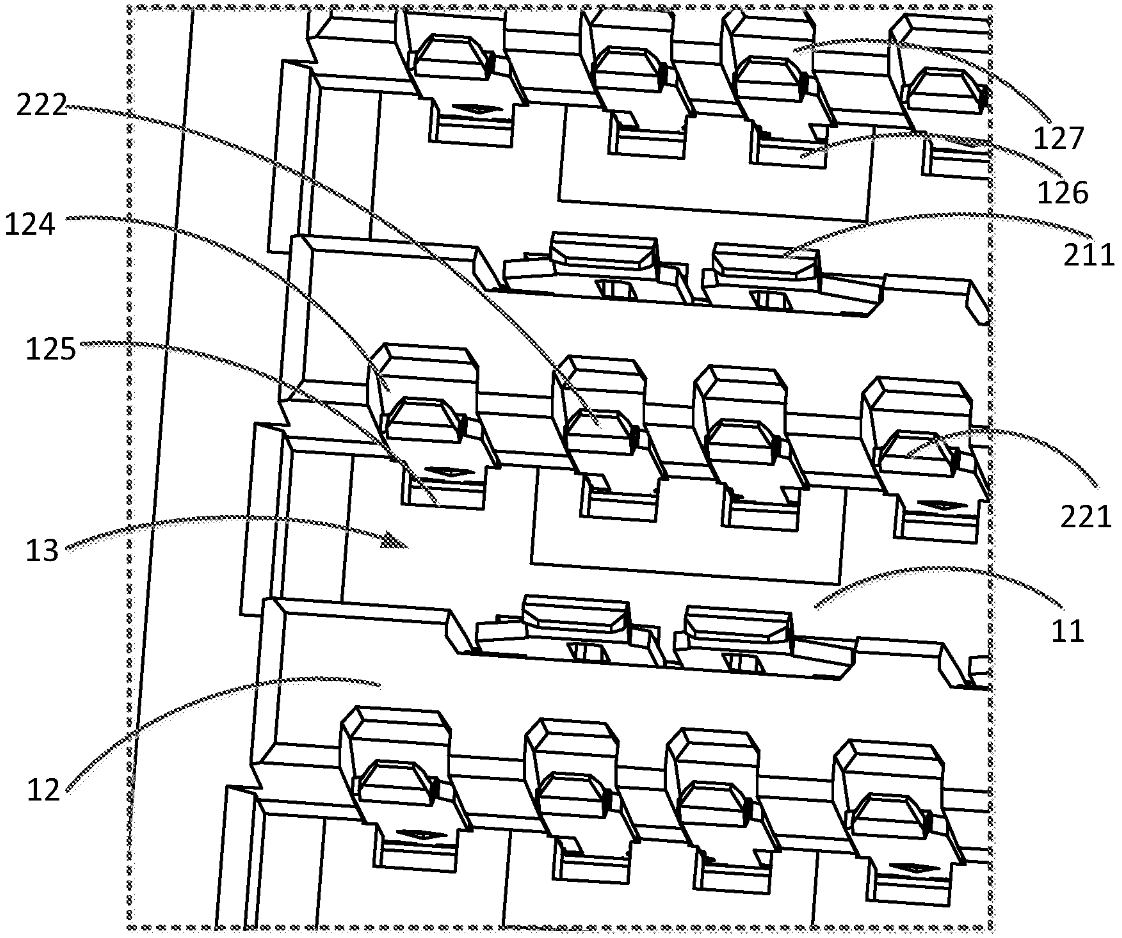
FIG. 2 shows a schematic enlarged view of a part 'A' shown in FIG. 1.
Figure 3:
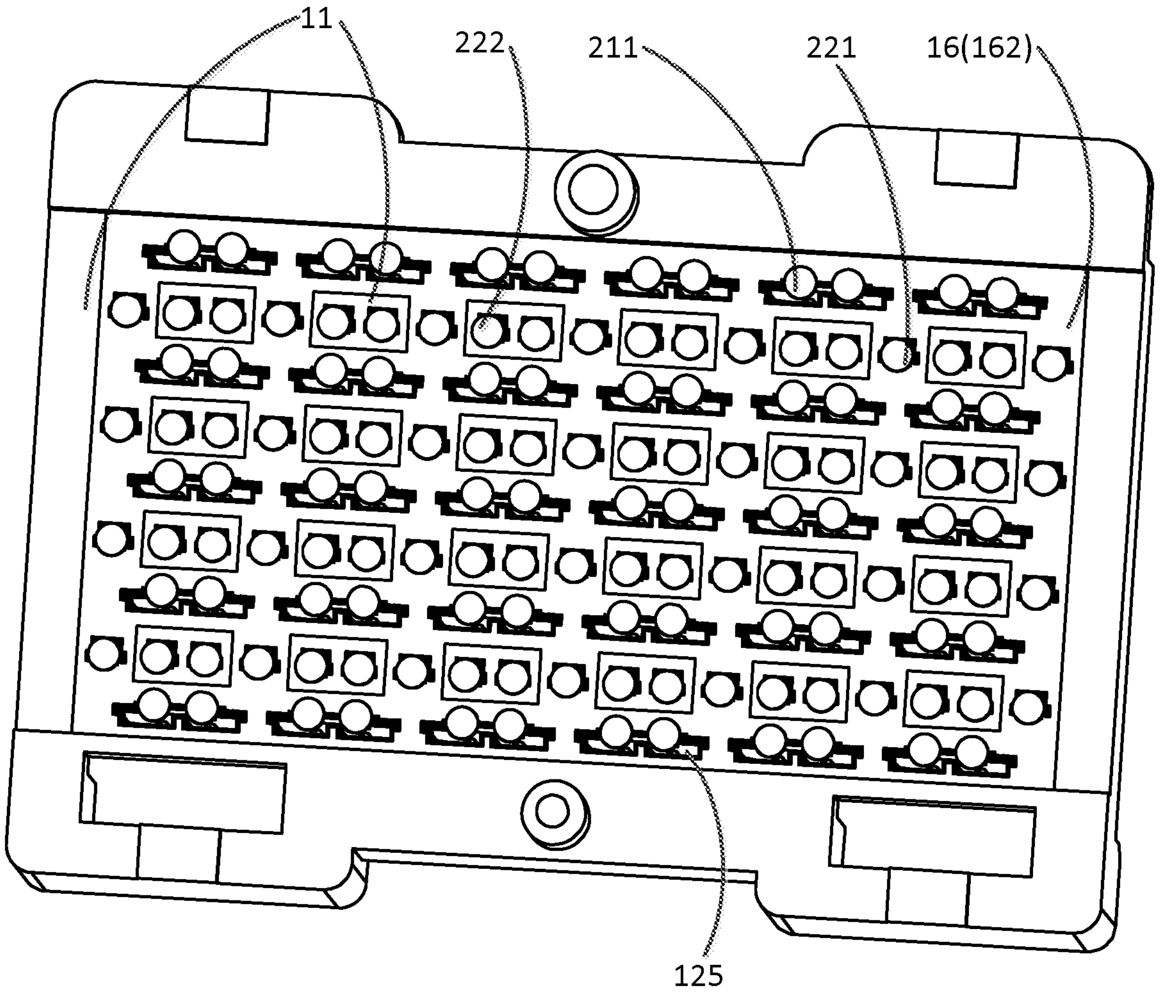
FIG. 3 shows another schematic perspective view of the electrical connector shown in FIG. 1.
Figure 4:
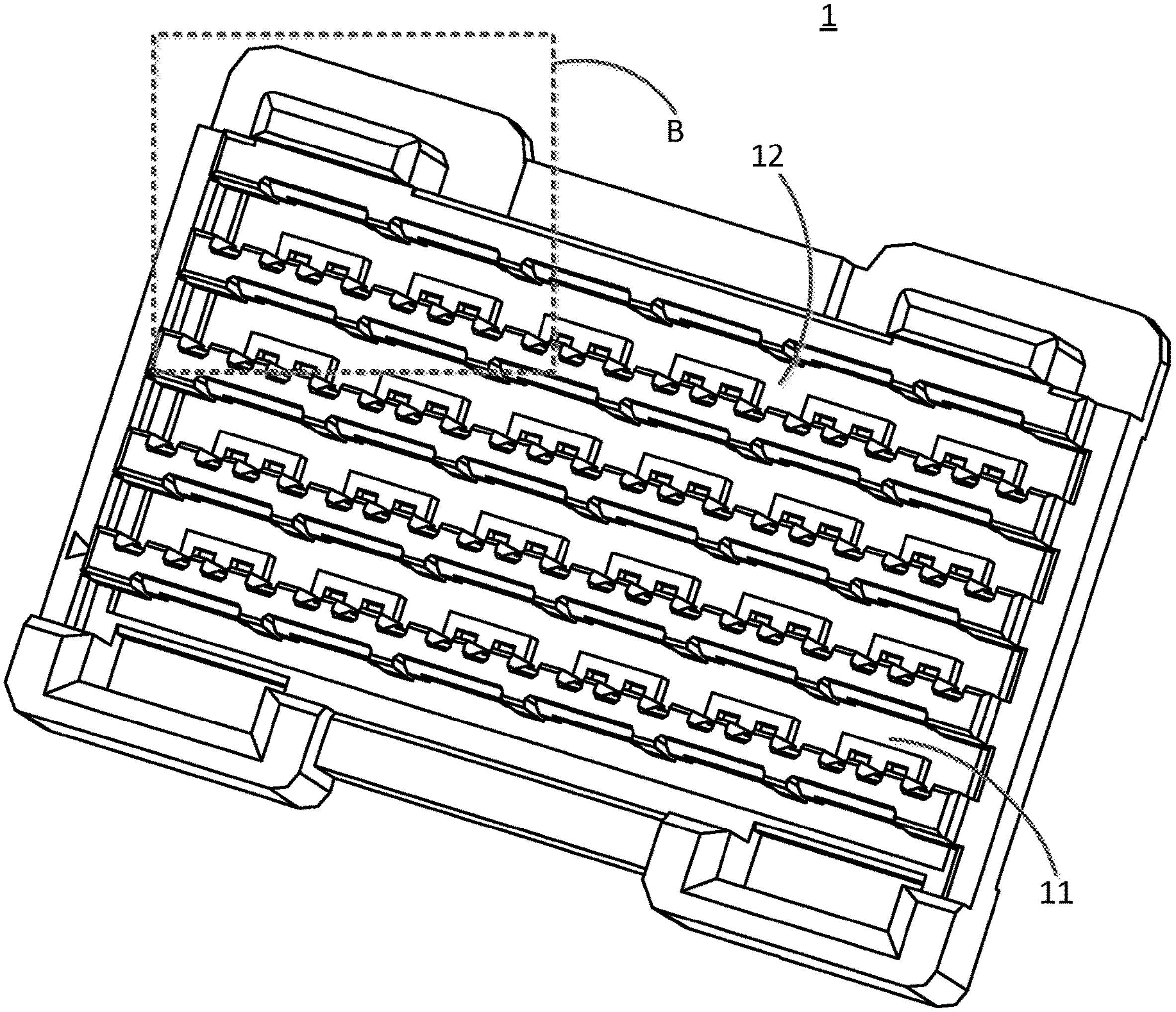
FIG. 4 shows a schematic perspective view of an insulation base according to an exemplary embodiment of the present disclosure.
Figure 5:
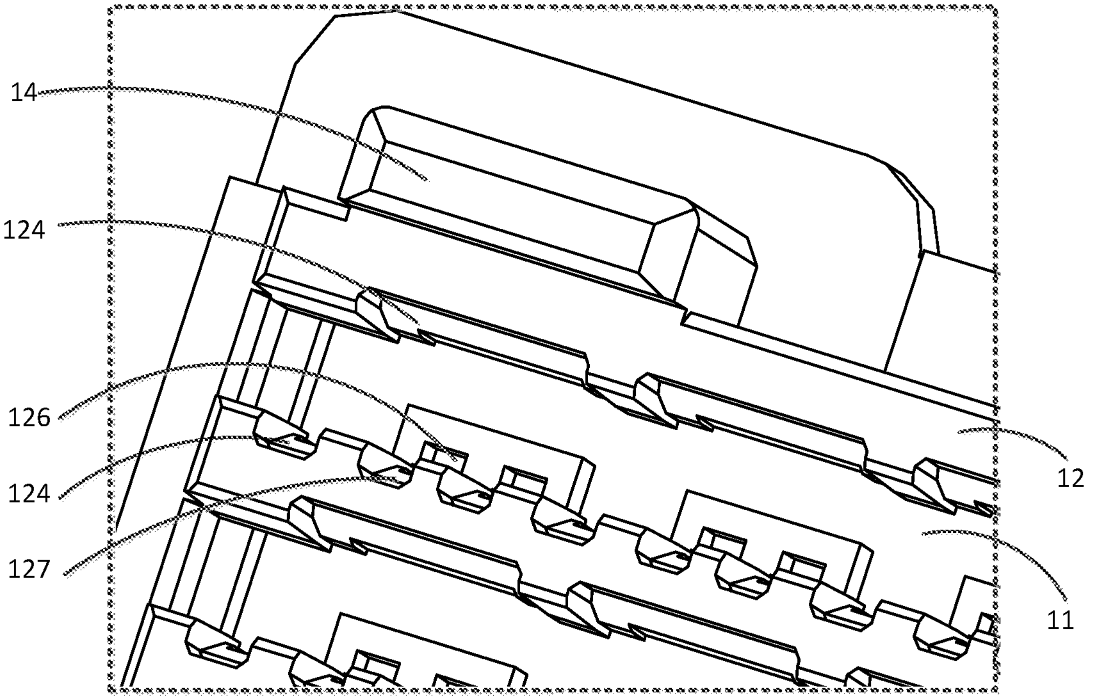
FIG. 5 shows a schematic enlarged view of a part 'B' shown in FIG. 4.
Figure 6:
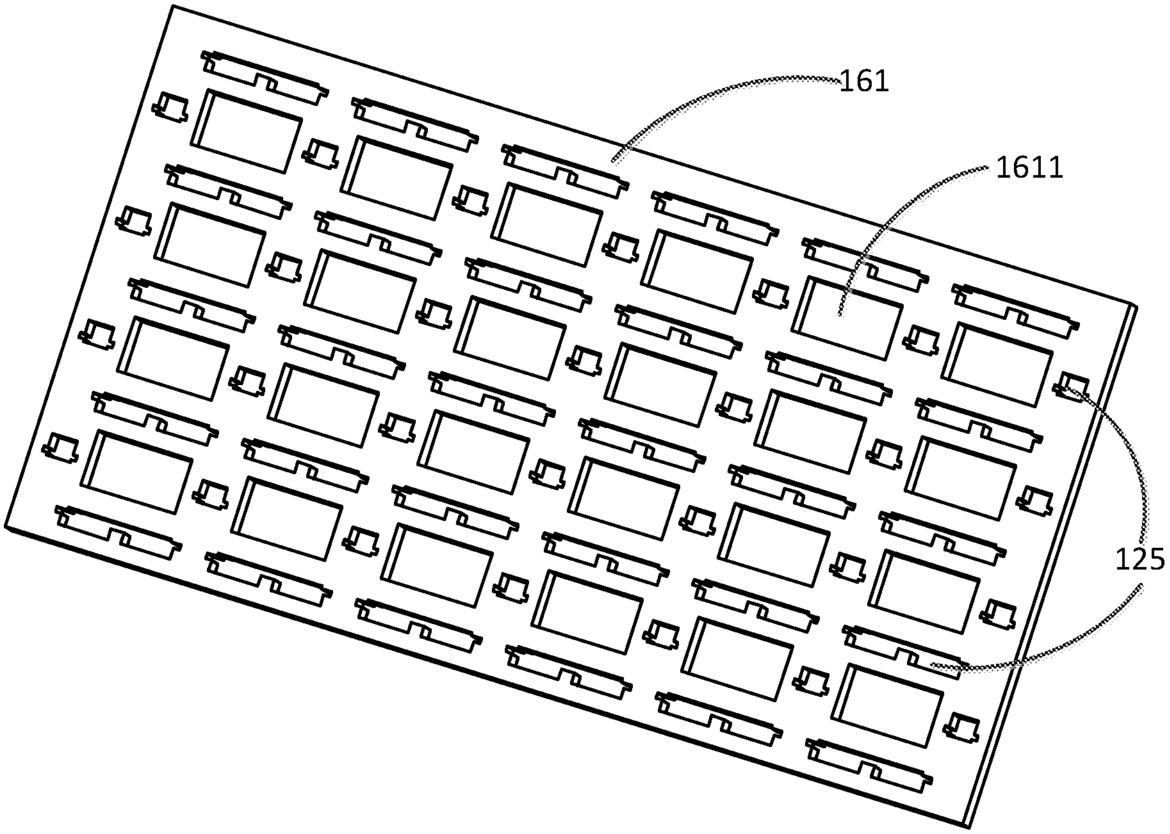
FIG. 6 shows a schematic perspective view of a metallization layer according to an exemplary embodiment of the present disclosure, without showing the insulation base.

FIG. 1 shows a schematic perspective view of an electrical connector according to an exemplary embodiment of the present disclosure. FIG. 2 shows a schematic enlarged view of a part 'A' shown in FIG. 1. FIG. 3 shows another perspective view of the electrical connector shown in FIG. 1. FIG. 4 shows a schematic perspective view of an insulation base according to an exemplary embodiment of the present disclosure. FIG. 5 shows a schematic enlarged view of a part 'B' shown in FIG. 4. FIG. 6 shows a schematic perspective view of a metallization layer according to an exemplary embodiment of the present disclosure, without showing the insulation base.

According to an exemplary embodiment of the present disclosure, as shown in FIGS. 1-6, an electrical connector suitable for being applied in a communication system and transmitting signals at a high speed of for example no less than 112 Gbps. The electrical connector includes an insulation base 1, a plurality of grounding terminals 211, 221 mounted in the insulation base 1, and a plurality of differential signal terminal pairs 222 mounted in the insulation base 1. The plurality of grounding terminals 211, 221 and the plurality of differential signal terminal pairs 222 are arranged into a plurality of terminal rows, each of the plurality of differential signal terminal pairs 222 is located between two adjacent grounding terminals 221 in one terminal row and between two other grounding terminals 211 of two terminal rows adjacent to the one terminal row. The insulation base 1 is provided with an electrical connection layer 16 electrically insulated from the differential signal terminal pairs 222. At least two ones of the plurality of grounding terminals are electrically connected to each other by the electrical connection layer 16. With the electrical connection layer, a sensitivity of the high-frequency transmission performance of the electrical connector to manufacturing tolerance in dimension of a product such as the grounding terminals can be reduced, and a resonance generated during transmitting of high-frequency signals can be improved to make the signal transmission more stable.

In an exemplary embodiment of the present disclosure, the electrical connection layer 16 includes a metallization layer 161 laid on the insulation base 1, and a conductive layer 162 covering the metallization layer. The metallization layer 161 is formed on the insulation base 1 by injection molding. The metallization layer 161 is a plastic layer containing conductive particles therein. The conductive particles include metal particles. For example, the metal particles include palladium particles. The conductive layer 162 includes a metal layer with a good conductivity, such as a nickel layer, a copper layer, or a gold layer.

Figure 7:
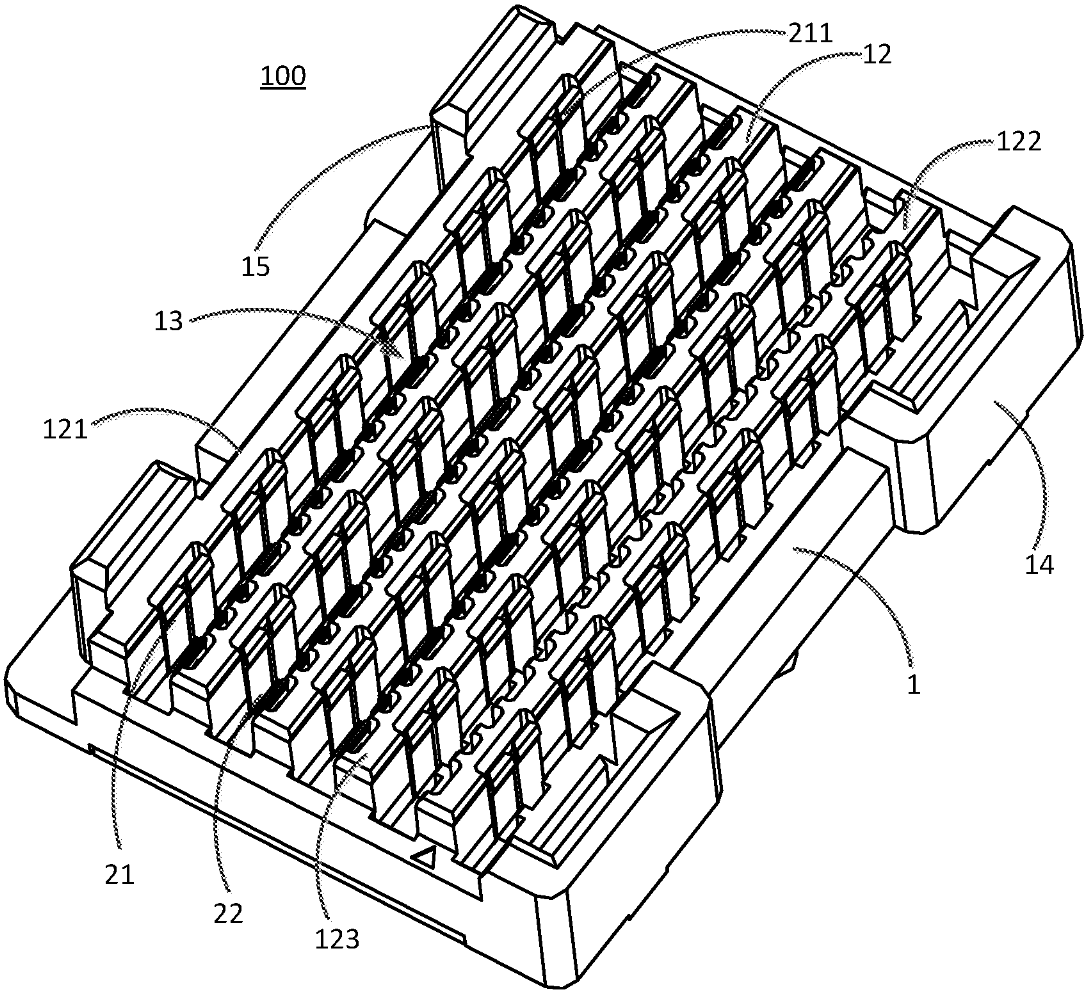
FIG. 7 shows another schematic perspective view of the electrical connector shown in FIG. 1, without showing a conductive layer and a metallization layer.
Figure 8:
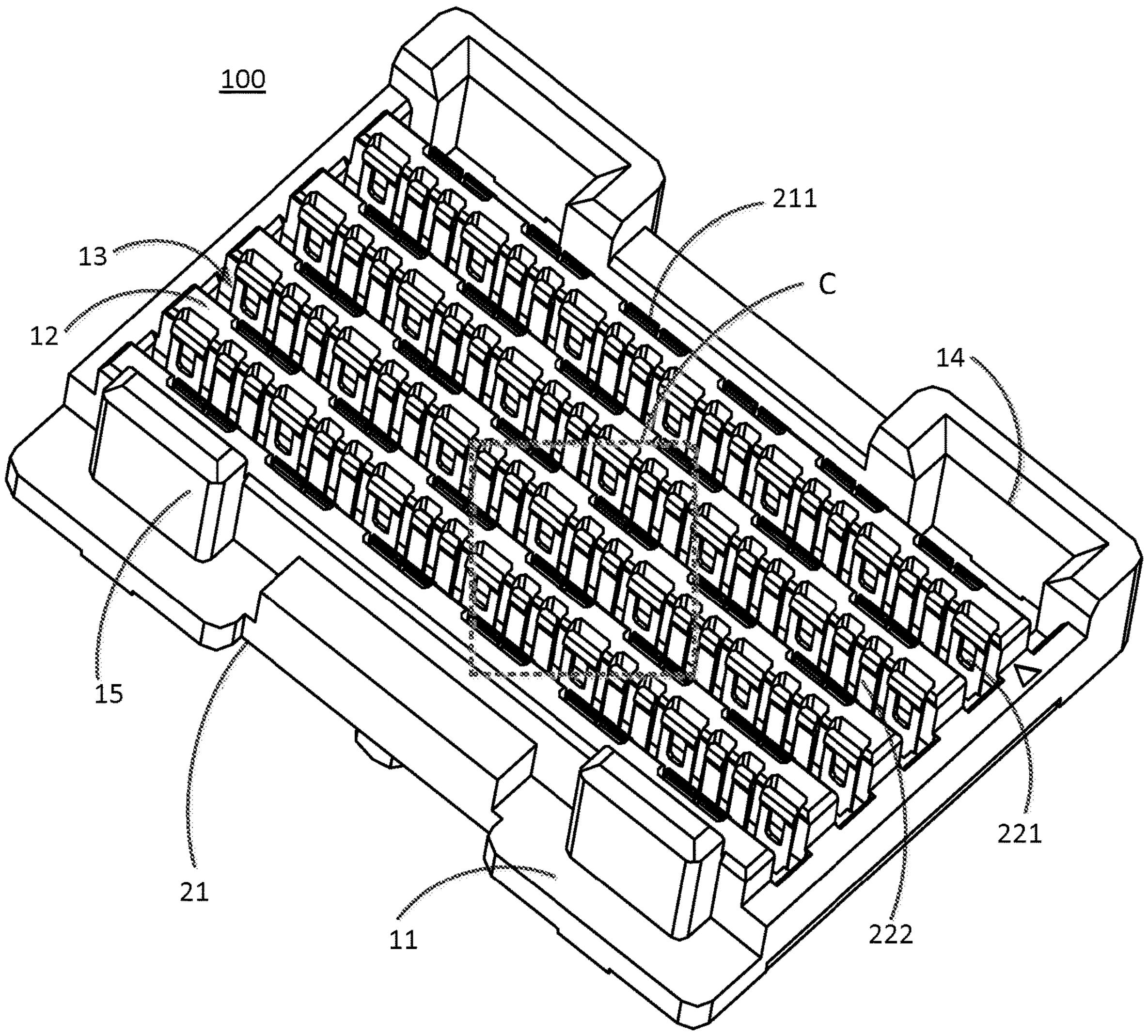
FIG. 8 shows a further another schematic perspective view of the electrical connector shown in FIG. 1, without showing the conductive layer and the metallization layer.
Figure 9:
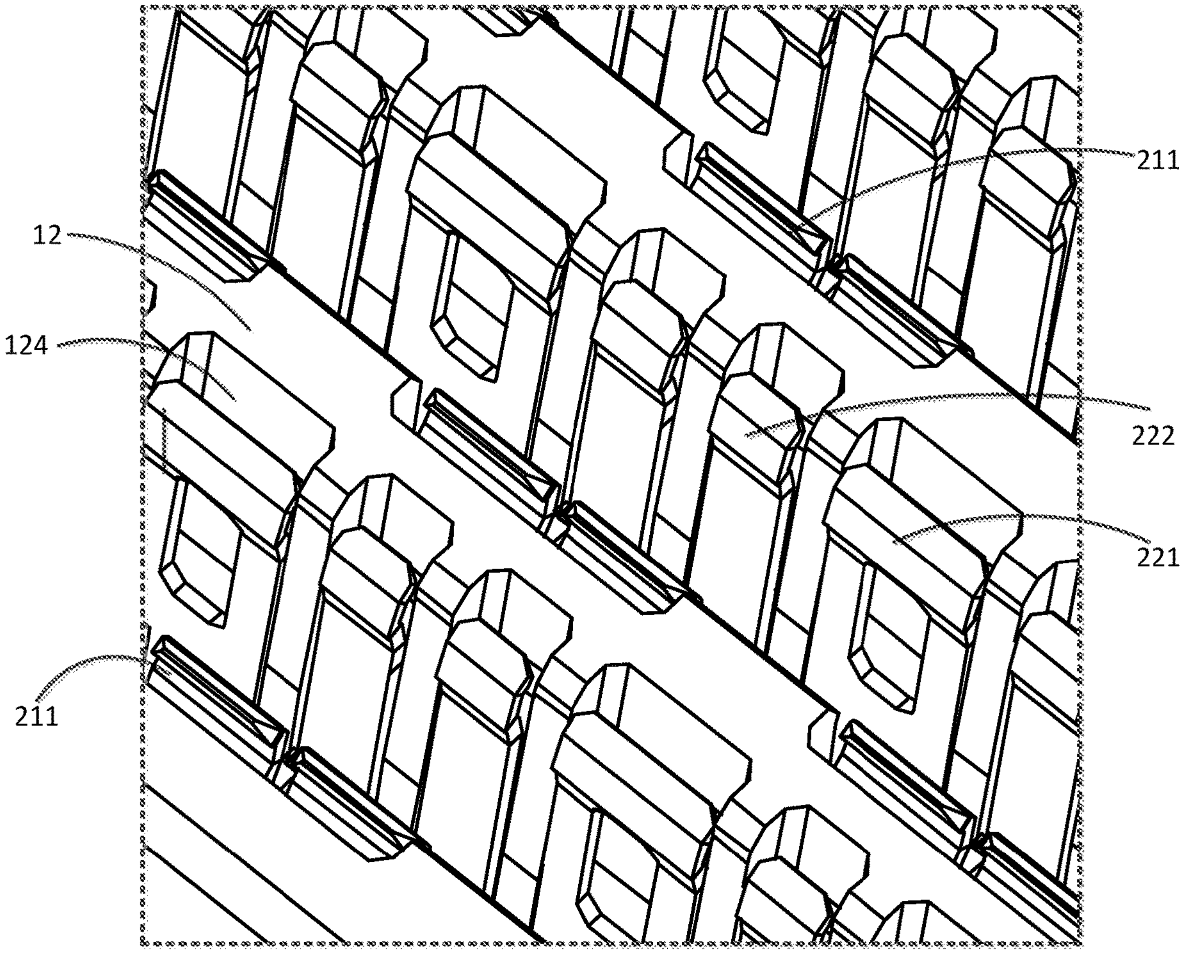
FIG. 9 shows a schematic enlarged view of a part 'C' shown in FIG. 8.
Figure 10:
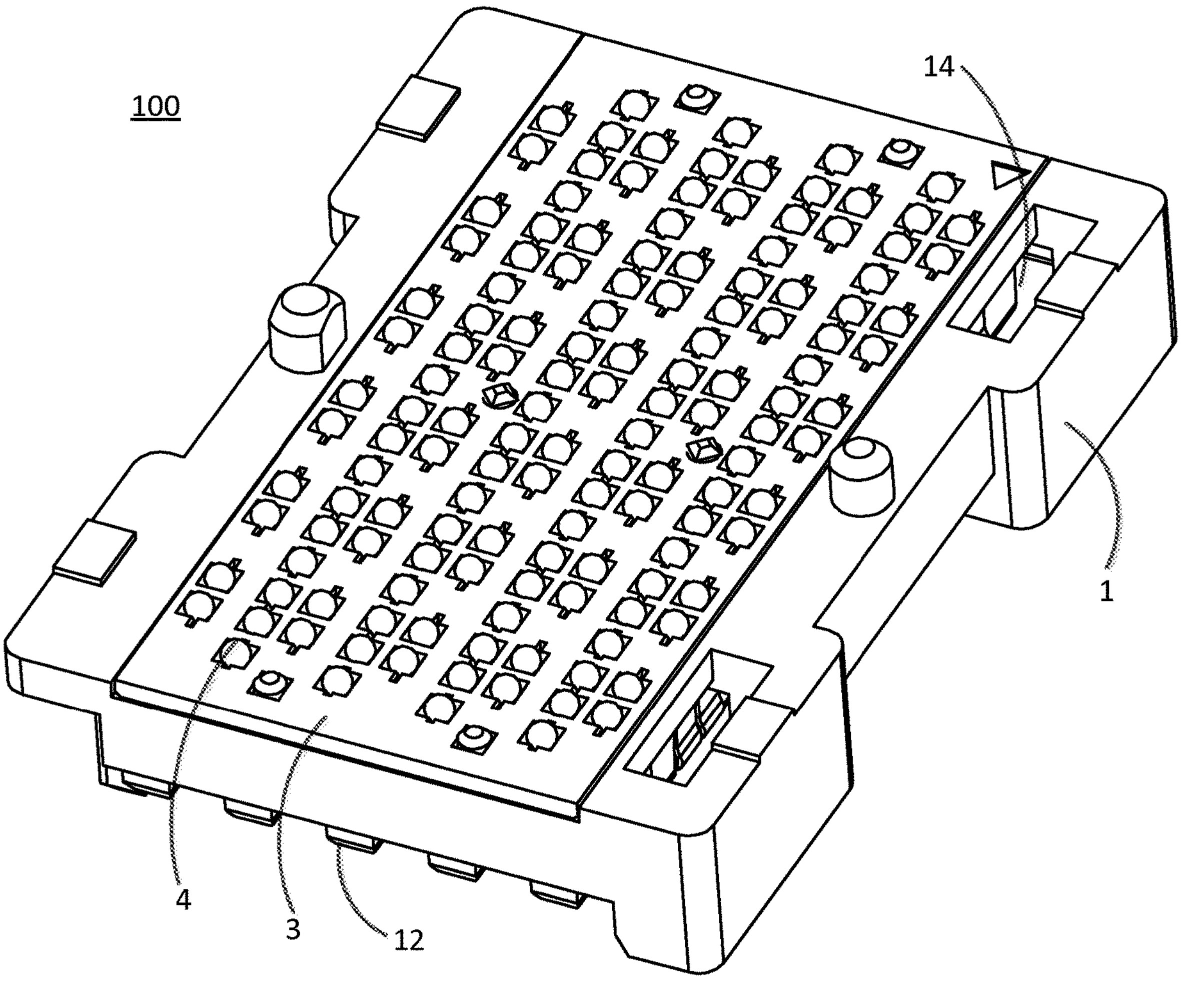
FIG. 10 shows another schematic perspective view of the electrical connector shown in FIG. 1 with an isolation pad shown.
Figure 11:
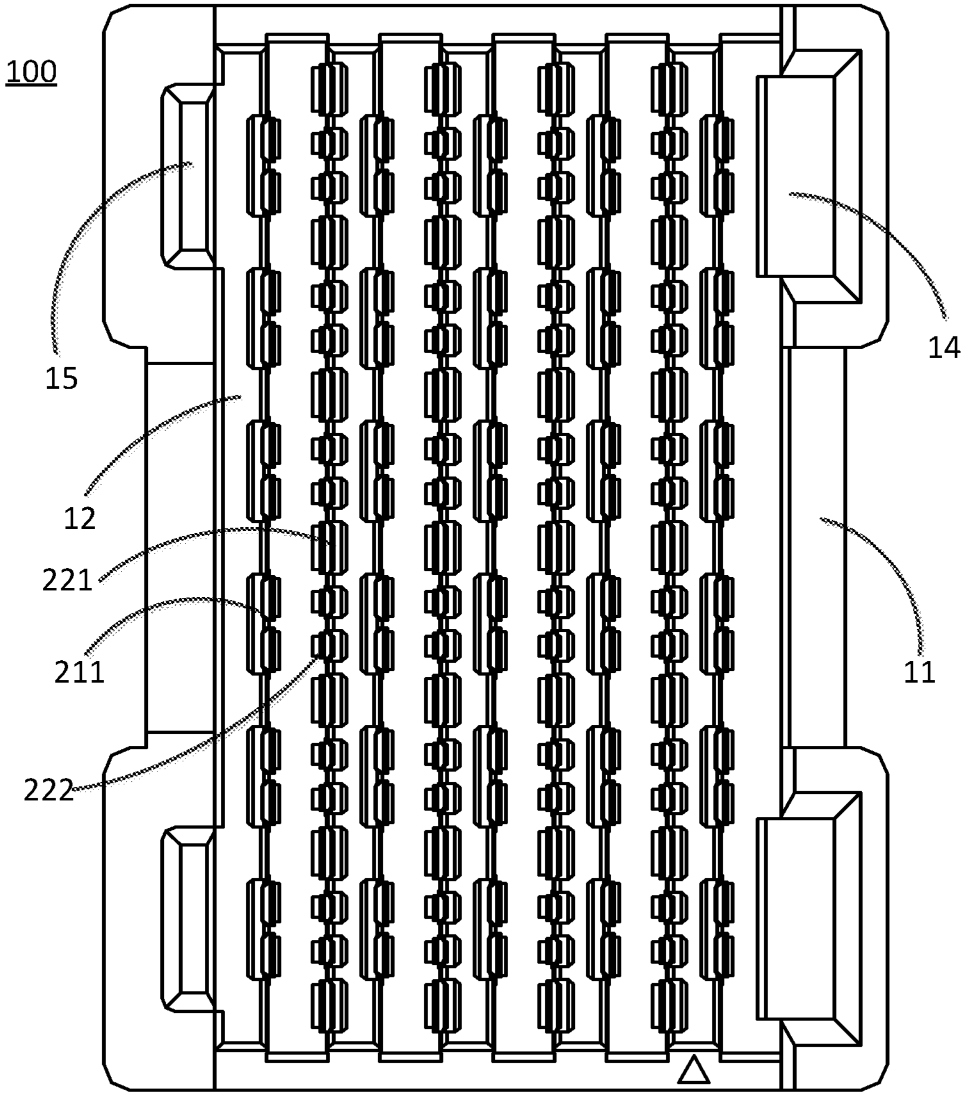
FIG. 11 shows a top view of the electrical connector shown in FIG. 7.
Figure 12:
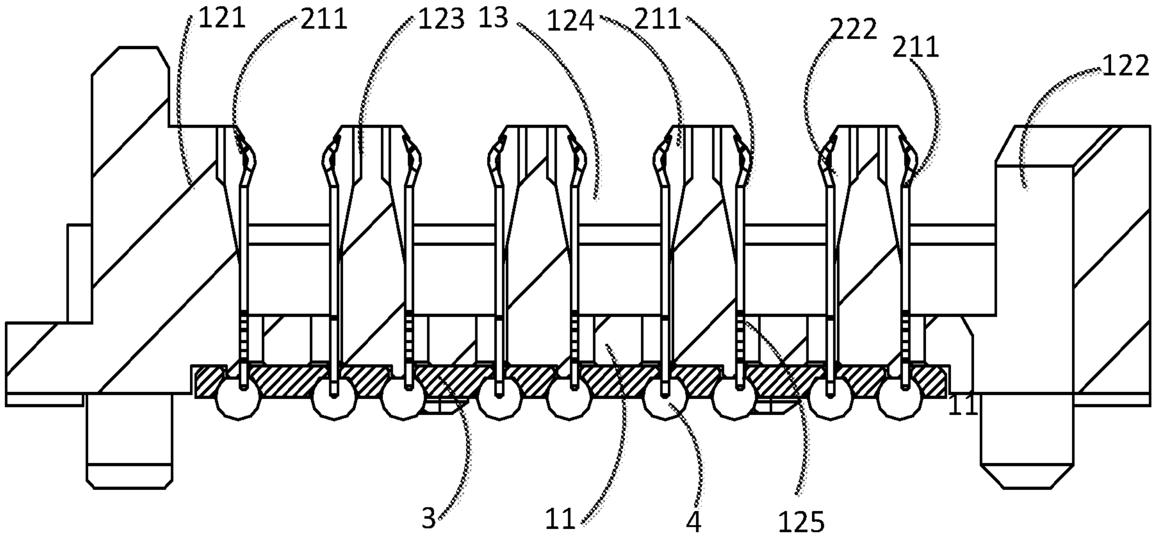
FIG. 12 shows a transverse cross-sectional view of the electrical connector shown in FIG. 7.

FIG. 7 shows another schematic perspective view of the electrical connector 100 shown in FIG. 1, without showing the conductive layer and the metallization layer. FIG. 8 shows another schematic perspective view of the electrical connector shown in FIG. 1, without showing the conductive layer and the metallization layer. FIG. 9 shows a schematic enlarged view of a part 'C' shown in FIG. 8. FIG. 10 shows another schematic perspective view of the electrical connector shown in FIG. 1, with an isolation pad being shown. FIG. 11 shows a top view of the electrical connector shown in FIG. 7. FIG. 12 shows a transverse cross-sectional view of the electrical connector shown in FIG. 7.

In an exemplary embodiment of the present disclosure, referring to FIGS. 1-3 and 7-12, the insulation base 1 includes a bottom wall 11 and a plurality of protruding bars 12. The grounding terminals and the differential signal terminal pairs 222 extend from a first side to a second side of the bottom wall 11 in a first direction (e.g., a height direction). The plurality of protruding bars 12 protrude from the first side of the bottom wall 11 and extend in a second direction (e.g., a row direction or length direction) perpendicular to the first direction. The grounding terminals and/or the differential signal terminals protruding from the second side of the bottom wall are held against a side wall of the respective protruding bar 12.

Figure 13:
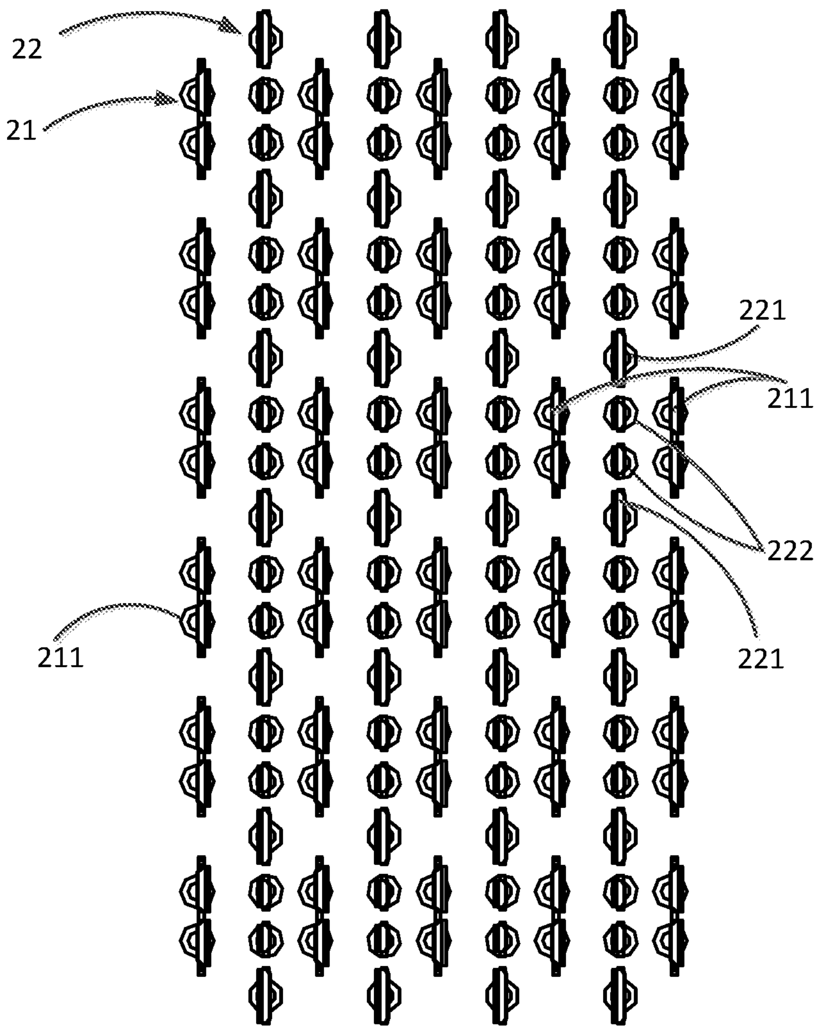
FIG. 13 shows a top view of an arrangement of terminals of the electrical connector according to an exemplary embodiment of the present disclosure.
Figure 14:
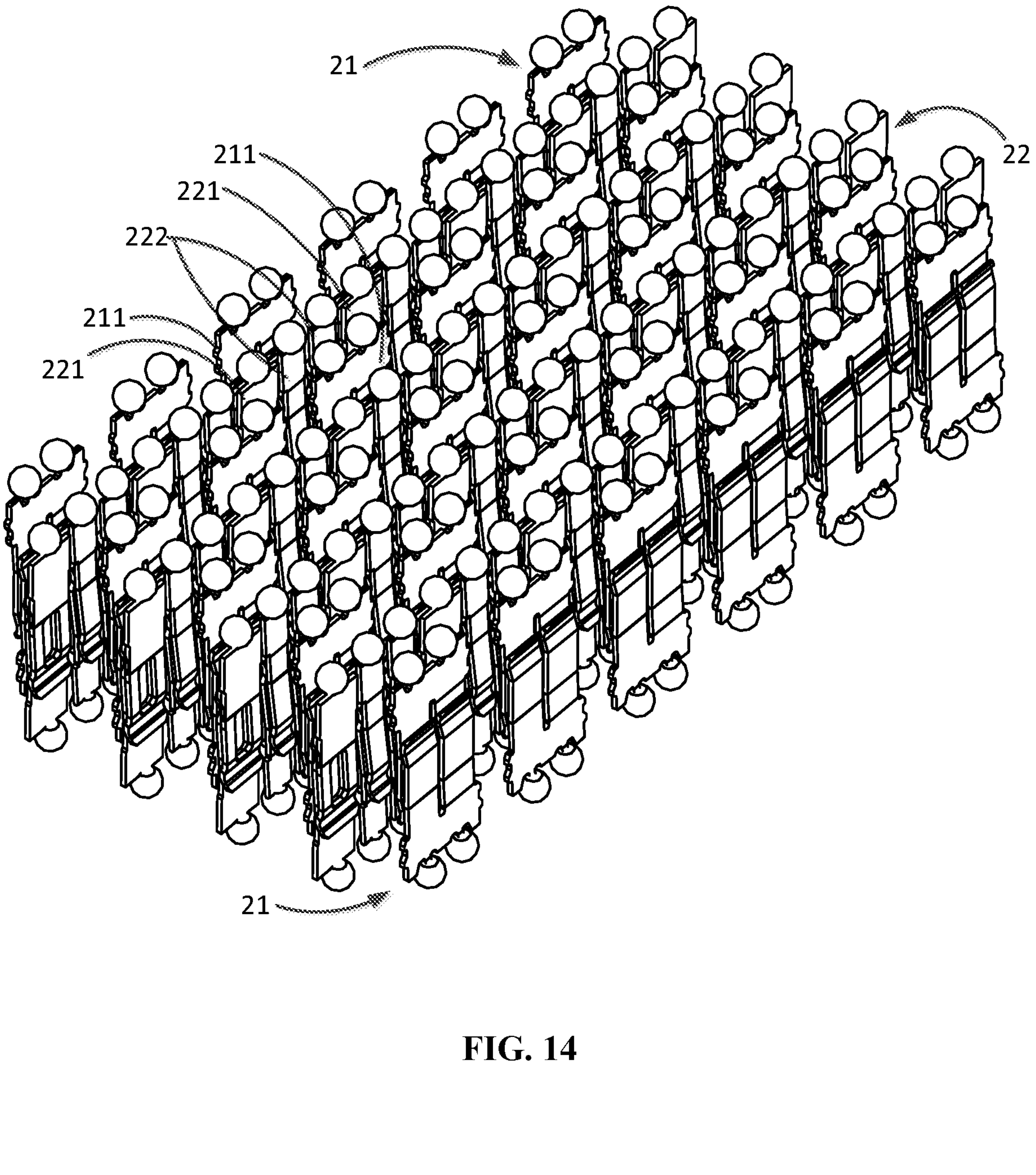
FIG. 14 shows a schematic perspective view of an arrangement of the terminals of the electrical connector according to an exemplary embodiment of the present disclosure.
Figure 15:
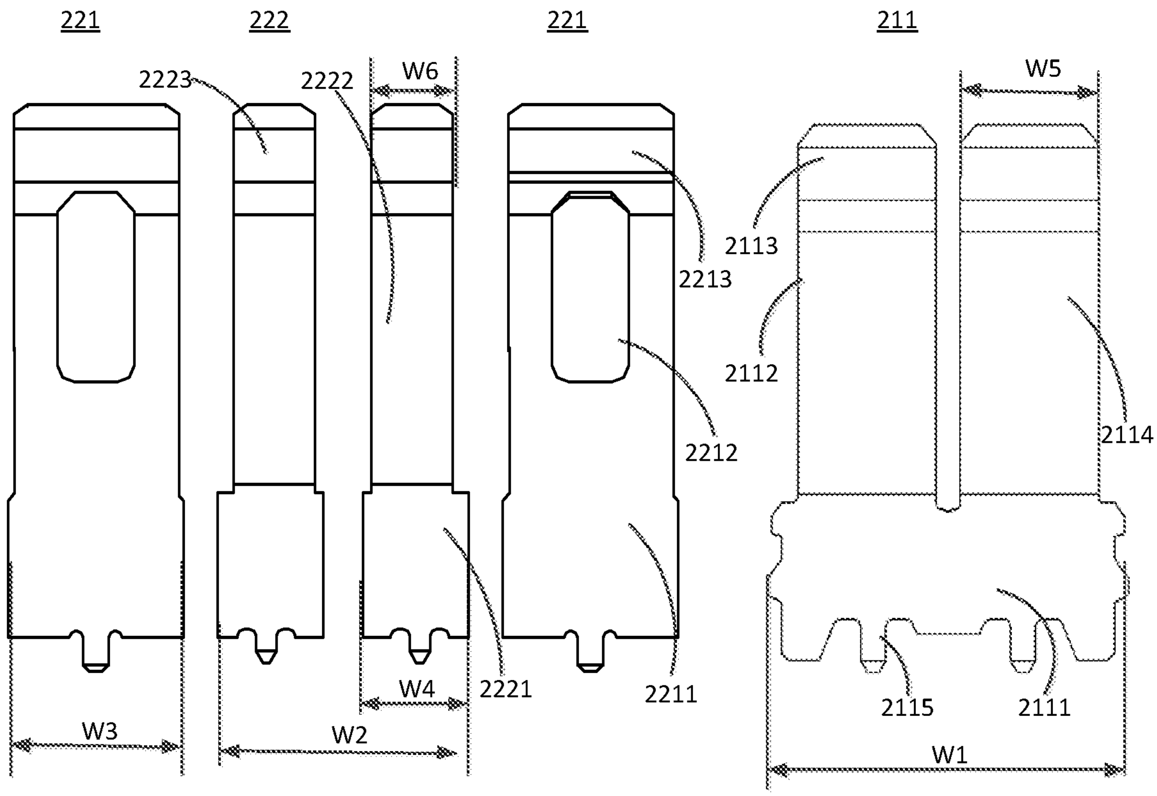
FIG. 15 shows a schematic plan view of three types of terminals of the electrical connector according to an exemplary embodiment of the present disclosure.

FIG. 13 shows a top view of an arrangement of terminals of the electrical connector according to an exemplary embodiment of the present disclosure. FIG. 14 shows a schematic perspective view of an arrangement of the terminals of the electrical connector according to an exemplary embodiment of the present disclosure. FIG. 15 shows a schematic plan view of three types of terminals of the electrical connector according to an exemplary embodiment of the present disclosure.

In an exemplary embodiment of the present disclosure, referring to FIGS. 1-3 and 13-15, the plurality of terminal rows 2 includes a plurality of grounding terminal rows 21 and a plurality of hybrid terminal rows 22. Further, each of the grounding terminal rows is composed of a plurality of first grounding terminals 211, with no differential signal terminal included in each grounding terminal row 21. The plurality of hybrid terminal rows 22 are composed of a plurality of second grounding terminals 221 and a plurality of differential signal terminal pairs 222. Further, each of the differential signal terminal pairs 222 is located between two second grounding terminals 221. Each of the differential signal terminal pairs 222 is located between two adjacent grounding terminals 221 in one terminal row and between two other grounding terminals 221 of two terminal rows adjacent to the one terminal row. Each of the differential signal terminal pairs 222 includes two adjacent differential signal terminals. With this arrangement, any two hybrid terminal rows are not disposed directly adjacent to each other.

Each of the differential signal terminal pairs 222 is located between two adjacent first grounding terminals 221 in a third direction (e.g., a width direction or column direction) perpendicular to the first direction (e.g., the height direction) and the second direction (e.g., the row direction). In this way, each of differential signal terminal pairs is disposed adjacent to the grounding terminals in the row direction and in the column direction. Thus, each of differential signal terminal pairs is surrounded by the grounding terminals. In this way, a signal crosstalk between the differential signal terminal pairs can be suppressed, which allows the grounding terminals and the differential signal terminals to be arranged at a higher density while ensuring the high-speed signal transmission performance of the electrical connector.

In an alternative embodiment of the present disclosure, each of the terminal rows is a hybrid terminal row including the grounding terminals and the differential signal terminal pairs, and further, the grounding terminals are arranged at both sides of each of the differential signal terminal pairs in the row and column directions.

In an exemplary embodiment of the present disclosure, referring to FIGS. 7-12, the plurality of protruding bars 12 include a first outer protruding bar 121, a second outer protruding bar 122, and at least one middle protruding bar 123 located between the first outer protruding bar and the second outer protruding bar. One of two adjacent terminal rows is defined as the grounding terminal row 21, and the other is defined as the hybrid terminal row 22. One grounding terminal row 21 is provided on an inner side of the first outer protruding bar 121, and one grounding terminal row 21 and one hybrid terminal row 22 are provided on outer and inner sides of the second outer protruding bar 122 respectively. One grounding terminal row 21 and one hybrid terminal row 22 are provided on either side of each of the middle protruding bars 123 respectively. In this way, except the first outer protruding bar 121, each of the protruding bars is arranged such that the grounding terminal row 21 is disposed on one of two side walls of the protruding bar extending in the second direction and the hybrid terminal row 22 is disposed on the other side wall of the protruding bar. Thus, no protruding bar is arranged with the grounding terminal row on the each of two opposite side walls thereof or with the hybrid terminal row on each of two opposite side walls thereof. With this arrangement, the grounding terminal is located at the outermost side, and no signal terminal is located on the outermost side, thereby avoiding the crosstalk between the signal terminals and other external terminals.

In an exemplary embodiment of the present disclosure, referring to FIGS. 8-12, an insertion slot 13 is formed between two adjacent protruding bars 12, and the grounding terminal row 21 and the hybrid terminal row 22 are arranged on two side walls of the insertion slot 13, respectively. In this way, the grounding terminal row 21 is arranged on one of the two side walls of the insertion slot 13, and the hybrid terminal row 22 is arranged on the other side wall of the insertion slot 13. Thus, no insertion slot is arranged with the grounding terminal row on each of the two side walls thereof or with the hybrid terminal row on each of the two side walls thereof.

Figure 17:
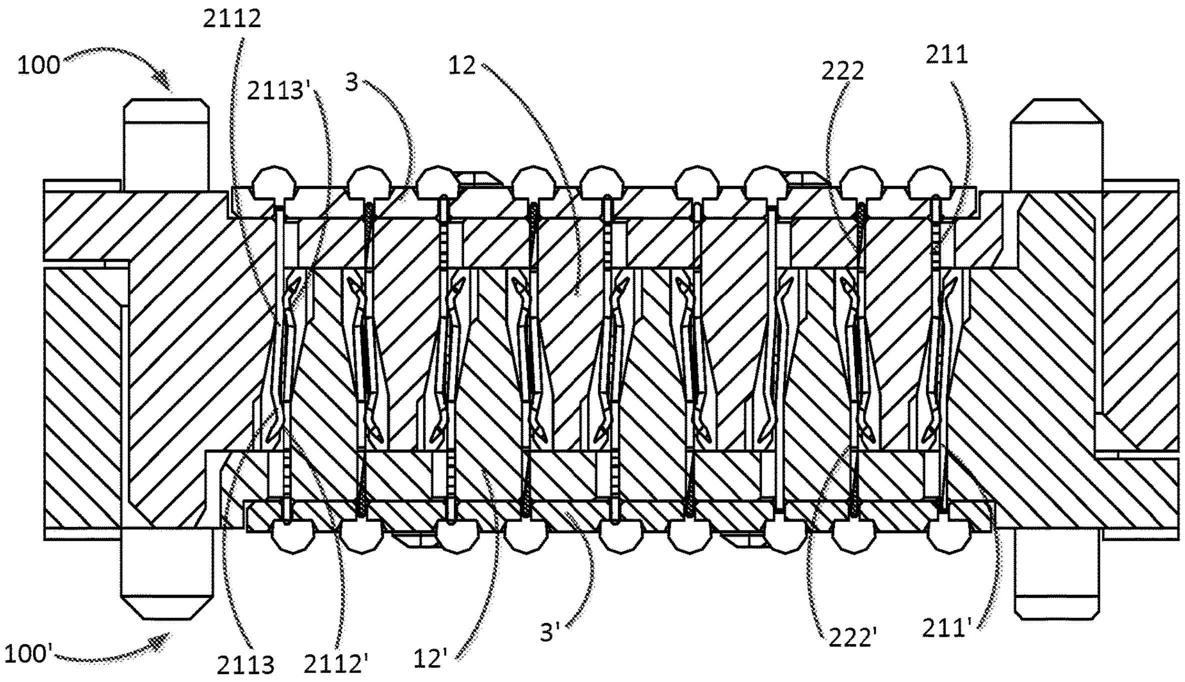
FIG. 17 shows a transverse cross-sectional view of a connector assembly according to an exemplary embodiment of the present disclosure.

Referring to FIG. 17, according to an exemplary embodiment of the present disclosure, there is provided a connector assembly including two electrical connectors 100 and 100', each of which is the electrical connector described according to any one of the above embodiments. In the connector assembly, the grounding terminals in the two electrical connectors are electrically connected to each other and the differential signal terminal pairs in the two electrical connectors are electrically connected to each other, so as to realize an electrical connection of the two electrical connectors with each other. Specifically, the first grounding terminals 211 of one electrical connector 100 are electrically connected to the first grounding terminals 211' of the other electrical connector 100', the second grounding terminals 221 of the one electrical connector 100 are electrically connected to the second grounding terminals 221' of the other connector 100', and the differential signal terminal pairs 222 of the one electrical connector 100 are electrically connected with the differential signal terminal pairs 222' of the other electrical connector 100' respectively. Further, circuit boards 3, 3' are provided at first sides of bottom walls of the electrical connectors 100, 100' to be electrically with the grounding terminals and the differential signal terminals for establishing the electrical connection between the two circuit boards. In this way, signal transmission between the two circuit boards can be realized through the electrical connectors of the present disclosure.

In an exemplary embodiment of the present disclosure, referring to FIGS. 12 and 17, the insertion slot 13 has a width approximately equal to or slightly greater than that of the protruding bar 12 or 12', such that the protruding bar 12 of the one electrical connector 100 can be inserted into the insertion slot of the other electrical connector 100' so as to assemble the one electrical connector and the other electrical connector together. In this way, when electrically connecting the two circuit boards 3, 3', only one type of electrical connector is required, and the protruding bar and the insertion slot of the two electrical connectors 100 and 100' are engaged with each other, which reduces the manufacturing cost of the electrical connector.

In an exemplary embodiment of the present disclosure, referring to FIG. 12, a width of a projection of each of the differential signal terminal pairs 222 in the third direction (e.g., the width direction) perpendicular to the first and second directions is less than that of the first grounding terminal 211 in the third direction. In other words, the width of the projection of each of the differential signal terminal pairs 222 in the third direction is defined within the projection of the first grounding terminal 211 in the third direction.

Referring to FIGS. 12 and 14, the first grounding terminal 211 includes a first body portion 2111 and a first elastic portion 2112 extending from the first body portion 2111. Further, the first elastic portion 2112 has a free end formed as a first arc-shaped contact portion 2113. The second grounding terminal 221 includes a second body portion 2211 and a second elastic portion 2212 extending from the second body portion 2211. Further, the second elastic portion 2212 has a free end formed as a second arc-shaped contact portion 2213. The differential signal terminal includes a third body portion 2221 and a third elastic portion 2222 extending from the third main body 2221. Further, the third elastic portion 2222 has a free end formed as a third arc-shaped contact portion 2223. In addition, each of the first body portion 2111 of the first grounding terminal 211, the second body portion 2211 of the second grounding terminal 221 and the third body portion 2221 of the differential signal terminal is provided with a soldering portion 2115. After respectively terminals are mounted in the insulation base, solder balls 4 may be pre-arranged on the soldering portions 2115 to be soldered together with electrical contacts of the circuit board.

As shown in FIG. 17, when the one electrical connector 100 is assembled with the other electrical connector 100', the contact portions of the terminals of the one connector 100 are brought into contact with the respective elastic portions of the terminals of the other electrical connector. At the same time, the contact portions of the other electrical connector 100' are brought into contact with the respective elastic portions of the one electrical connector 100. For example, when the one electrical connector 100 is assembled with the other electrical connector 100', the first contact portion 2113 of the first grounding terminal 211 of the one connector 100 is brought into in contact with the first elastic portion 2112' of the first grounding terminal 211 of the other electrical connector 100'. At the same time, the first elastic portion 2112' of the other electrical connector 100' is brought into contact with the first elastic portion 2113 of the one electrical connector 100. Therefore, the two first grounding terminals 211 engaged with each other of the two electrical connectors are brought into electrical contact with each other at the four first elastic contact portions, such that four electrical contacts are formed at the two sets of first contact portions engaged with each other of the two first grounding terminals. The mated differential signal terminals are engaged with each other at the third contact portions, at which two contact points are formed. In this way, the terminals of the two electrical connectors corresponding to each other can be electrically connected reliably.

In an exemplary embodiment of the present disclosure, referring to FIG. 15, the first elastic portion 2113 includes two sub-elastic portions 2114 spaced apart, which can reduce an elastic force of the first elastic portion so as to facilitate the connection of the two electrical connectors. The first body portion 2111 of the first grounding terminal 211 has a maximum width W1 greater than a total width W2 of the two third body portions 2221 of the differential signal terminal pair. The second body portion 2211 of the second grounding terminal 221 has a width W3 greater than a width W4 of the third body portion. The width W3 of the second body portion 2211 of the second grounding terminal 221 is smaller than the total width W2 of the two third body portions 2221 of the differential signal terminal pair. The sub-elastic portion 2114 of the first grounding terminal 211 has a width W5 greater than a width W6 of the third elastic portion.

Figure 16:
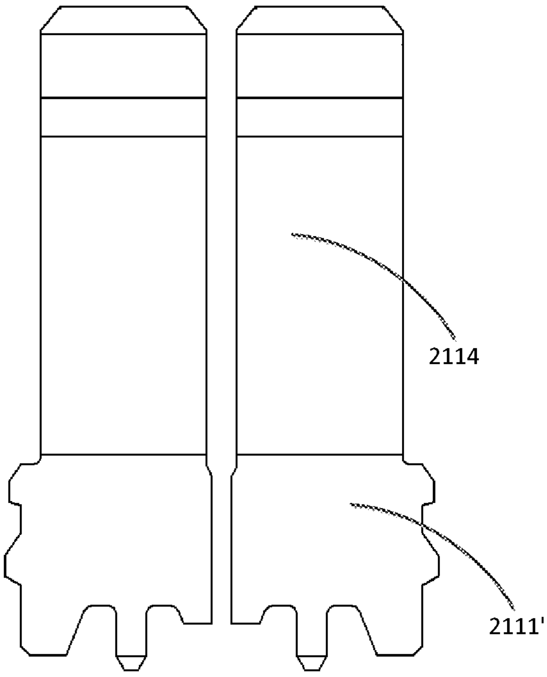
FIG. 16 shows a schematic plan view of a first grounding terminal according to another exemplary embodiment of the present disclosure.

FIG. 16 shows a schematic plan view of the first grounding terminal according to another exemplary embodiment of the present disclosure. The first body portion 2111 of the first grounding terminal 211 includes two sub-body portions 2111' spaced apart.

In an exemplary embodiment of the present disclosure, referring to FIGS. 1, 7, 8 and 10, the insulation base 1 is provided with a guide groove 14 and a guide post 15. The guide post 15 of the one electrical connector 100 is insertable into the guide groove 14 of the other electrical connector 100'. When assembling the two electrical connectors together, the two electrical connectors can be connected only if the guide post and the guide groove of the two electrical connectors are aligned with each other. Otherwise, the two electrical connectors will not be connected with each other. Therefore, the guide post and the guide groove not only have a guiding function, but also can prevent the two electrical connectors from being mistakenly assembled together. In an exemplary embodiment of the present disclosure, the guide groove 14 and/or the guide post 15 has a height no less than that of the protruding bar 12.

In an exemplary embodiment of the present disclosure, as shown in FIGS. 1-3 and 10, the bottom wall 11 of the insulation base 1 is formed with a plurality of first through holes 125 and a plurality of second through holes 126, and the side wall of the protruding bar 12 is formed with a plurality of first recesses 124 and a plurality of second recesses 127 in communication with the first through holes 125 and the second through holes 126 respectively. The first grounding terminal 211 and the second grounding terminal 221 are each mounted in the first through hole 125 and the first recess 124. Further, the differential signal terminal of the differential signal terminal pairs 222 is mounted in the second through holes 126 and the second recesses 127. The body portion of each terminal of the first grounding terminal 211, the second grounding terminal 221 and the differential signal terminal pair 222 is mounted in the first through hole 125 and the second through hole 126, and the elastic portion and the contact portion of each terminal of the first grounding terminal 211, the second grounding terminal 221 and the differential signal terminal pair 222 are at least partially received in the first recess 124 and the second recess 127. When the two electrical connectors 100 and 100' are assembled together, the elastic portion and the contact portion of each terminal may be at least partially biased into the first recess 124 and the second recess 127, which facilitates the insertion and assembly operation of the two electrical connectors. The electrical connection layer 16 extends into the first through hole 125 to achieve a reliable electrical connection between the grounding terminal and the electrical connection layer and to facilitate the insertion and assembling operation of the two electrical connectors. At least two grounding terminals including the first grounding terminal 211 and the second grounding terminal 221, or all of the grounding terminals, can be electrically connected by the electrical connection layer 16, which can reduce the sensitivity of the high-frequency transmission performance of the electrical connector to manufacturing tolerance in dimension of a product, such as the grounding terminal, and can improve the resonance generated during transmitting of the high-frequency signals to make the signal transmission more stable.

In an exemplary embodiment of the present disclosure, as shown in FIGS. 3-5, the electrical connection layer 16 extends over regions of the bottom wall 11 expect a region where the differential signal terminal pairs 22 are located. Further, the electrical connection layer 16 extends into the first through hole 125. As there is no plastic layer and conductive layer in the region where the differential signal terminals are located, different differential signal terminals are electrically insulated from each other, and the differential signal terminal is also electrically insulated from the grounding terminal. In this way, each terminal can be electromagnetically shielded at a bottom portion of the electrical connector to further suppress the signal crosstalk.

According to an exemplary embodiment of another aspect of the present disclosure, there is provided a method for manufacturing the electrical connector 100, including: forming an insulation base 1 from a liquid crystal polymer (LCP) through for example an injection molding process (primary-shot injection); forming a metallization layer 161 on a surface of the insulation base 1; laying a conductive layer 162 on the metallization layer; mounting a plurality of grounding terminals, including a first grounding terminal 211 and a second grounding terminal 221, in the insulation base 1 respectively, such that at least two grounding terminals of the plurality of grounding terminals are electrically connected to each other through the conductive layer 162. The metallization layer and the conductive layer constitute an electrical connection layer 16. As the insulation base 1 is made of a plastic material, the surface of the insulation base 1 is difficult to be directly plated with a metal material. By forming the metallization layer on the insulation base 1, the conductive layer can be plated on the insulation base with the metallization layer to achieve an electrical connection of the plurality of grounding terminals.

In an exemplary embodiment of the present disclosure, forming an insulation base 1 through an injection molding process includes forming, in a bottom wall 11 of the insulation base 1, a second through hole 126 for mounting a differential signal terminal therein. The forming of the insulation base 1 further includes forming, in a protruding bar 12, a first recess 124 for receiving the grounding terminals (the first grounding terminal and the second grounding terminal) therein and a second recess 127 communicating with the second through hole 126 and configured for receiving the differential signal terminal therein.

In an exemplary embodiment of the present disclosure, forming a metallization layer 161 on a surface of the insulation base 1 includes injecting plastic containing conductive particles onto a portion of the surface of the insulation base through the injection molding process (secondary-shot injection). The metallization layer is a plastic layer containing the conductive particles therein. For example, the conductive particles include palladium particles. In an example, the conductive layer includes a metal layer having a good conductivity, such as a nickel layer or a gold layer.

In an exemplary embodiment of the present disclosure, as shown in FIGS. 14-16, during injecting a plastic containing conductive particles onto a portion of the surface of the insulation base, the first through hole 125 is formed to be in communication with the first recess 124 and suitable for receiving the grounding terminal, so that the metallization layer is formed in the first through hole to form the conductive layer. Specifically, during forming the insulation base 1 through primary-shot injection process, the first through hole 125 is not formed, and only the second through hole 126 suitable for receiving the differential signal terminal therein is formed in the bottom wall 11, then the first through hole 125 suitable for mounting the grounding terminal therein is formed during forming the plastic layer 161 through the secondary-shot injection molding process. The first through hole 125 penetrates through the bottom wall 11 of the insulation base 11 to be in communication with the first recess 124.

In an exemplary embodiment of the present disclosure, the conductive layer is plated on the metallization layer using a molded interconnect devices (MID) molding process, or the conductive layer is deposited on the metallization layer using a physical vapor deposition (PVD).

In an exemplary embodiment of the present disclosure, an isolation pad 3 is provided on the bottom wall to cover the conductive layer. After the grounding terminal and the differential signal terminal are mounted in the insulation base 1, the isolation pad 3 is mounted onto a first side (upper side of FIG. 3) of the bottom wall 11 of the electrical connector 100, and the soldering portion 2115 of each terminal passes through the isolation pad 3. Then, solder balls 4 made of a solder material are formed on the soldering portions 2115 so as to be electrically connected with the electrical contact of the circuit board.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:
- an insulation base including an electrical connection layer, the electrical connection layer having:
  - a metallization layer laid on the insulation base; and
  - a conductive layer laid directly on and covering the metallization layer;
- a plurality of grounding terminals mounted in the insulation base; and
- a plurality of differential signal terminal pairs mounted in the insulation base, the plurality of grounding terminals and the plurality of differential signal terminal pairs being arranged into a plurality of terminal rows, wherein each of the plurality of differential signal terminal pairs is located between two adjacent grounding terminals in one terminal row and between two other grounding terminals of two terminal rows adjacent to the one terminal row, at least two of the plurality of grounding terminals are electrically connected to each other via the electrical connection layer of the insulation base.

2. The electrical connector according to claim 1, wherein the metallization layer includes a plastic layer containing conductive particles therein.

3. The electrical connector according to claim 1, wherein each of the differential signal terminal pairs comprises two adjacent differential signal terminals.

4. The electrical connector according to claim 3, wherein the insulation base comprises:
- a bottom wall, wherein the grounding terminals and the differential signal terminals extend from a first side to a second side of the bottom wall in a first direction; and
- a plurality of protruding bars protruding from the second side of the bottom wall and extending in a second direction perpendicular to the first direction, wherein the grounding terminals and/or the differential signal terminals protruding from the second side of the bottom wall are held against a side wall of the respective protruding bar.

5. The electrical connector according to claim 4, wherein the plurality of terminal rows comprise:

a plurality of grounding terminal rows, each of which comprises a plurality of first grounding terminals of the plurality of grounding terminals; and a plurality of hybrid terminal rows, each of which comprises a plurality of second grounding terminals of the plurality of grounding terminals and a plurality of the differential signal terminal pairs and in each of which each of the differential signal terminal pairs is located between two of the second grounding terminals.

6. The electrical connector according to claim 5, wherein:

each of the hybrid terminal rows is located between two adjacent ones of the grounding terminal rows; and each of the differential signal terminal pairs is located between two adjacent ones of the first grounding terminals in a third direction perpendicular to the first and second directions.

7. The electrical connector according to claim 6, wherein:

the plurality of protruding bars comprise a first outer protruding bar, a second outer protruding bar, and at least one middle protruding bar located between the first outer protruding bar and the second outer protruding bar;

the first outer protruding bar is arranged with the grounding terminal row on an inner side thereof;

the second outer protruding bar is arranged with the grounding terminal row and the hybrid terminal row being located on outer and inner sides thereof respectively; and each of the middle protruding bars is arranged with the grounding terminal row and the hybrid terminal row being located on either side thereof respectively.

8. The electrical connector according to claim 7, wherein an insertion slot is formed between two adjacent protruding bars, the grounding terminal row and the hydride terminal row are located on either side of the insertion slot.

9. The electrical connector according to claim 8, wherein the insertion slot has a width slightly greater than that of the protruding bar, the protruding bar of one said electrical connector is insertable into the insertion slot of another the electrical connector to assembly the one electrical connector and the another electrical connector together.

10. The electrical connector according to claim 9, wherein a width of a projection of each of the differential signal terminal pairs in a third direction perpendicular to the first and second directions is less than that of the first grounding terminal in the third direction.

11. The electrical connector according to claim 9, wherein:

the first grounding terminal comprises a first body portion and a first elastic portion extending from the first body portion, the first elastic portion having a free end formed with a first arc-shaped contact portion;

the second grounding terminal comprises a second body portion and a second elastic portion extending from the second body portion, the second elastic portion having a free end formed with a second arc-shaped contact portion; and the differential signal terminal comprises a third body portion and a third elastic portion extending from the third main body, the third elastic portion having a free end formed with a third arc-shaped contact portion.

12. The electrical connector according to claim 4, wherein the insulation base is provided with a guide groove and a guide post, and the guide post of one said electrical connector is insertable into the guide slot of another said electrical connector.

13. The electrical connector according to claim 4, wherein the electrical connection layer extends over regions of the bottom wall except a region where the differential signal terminals are located.

14. The electrical connector according to claim 4, wherein:

the bottom wall of the insulation base is formed with a plurality of first through holes and a plurality of second through holes, and the side wall of the protruding bar is formed with a plurality of first recesses and a plurality of second recesses being in communication with the first through holes and the second through holes respectively; and each grounding terminal is mounted in the first through hole and the first recess, and the differential signal terminal of the differential signal terminal pairs is mounted in the second through hole and the second recess.

15. A method for manufacturing the electrical connector according to claim 1, comprising:

forming an insulation base, including:

forming, in a bottom wall of the insulation base, a second through hole for mounting a differential signal terminal therein; and forming, in a protruding bar of the insulation base, a first recess for receiving the grounding terminal therein and a second recess being in communication with the second through hole and suitable for receiving the differential signal terminal therein;

forming a metallization layer on a surface of the insulation base;

laying a conductive layer on the metallization layer; and mounting a plurality of grounding terminals in the insulation base respectively, such that at least two grounding terminals of the plurality of grounding terminals are electrically connected to each other by the conductive layer.

16. The method according to claim 15, wherein the step of forming a metallization layer on a surface of the insulation base comprises forming a plastic layer containing conductive particles onto a portion of the surface of the insulation base through injection molding.

17. The method according to claim 15, wherein the method further comprises, during forming a plastic layer containing conductive particles onto a portion of the surface of the insulation base through injection molding, forming a first through hole being in communication with the first recess and suitable for receiving the grounding terminal therein so that the metallization layer is formed in the first through hole.

18. An electrical connector, comprising:

an insulation base including an electrical connection layer;

a plurality of grounding terminals mounted in the insulation base; and a plurality of differential signal terminal pairs mounted in the insulation base, the plurality of grounding terminals and the plurality of differential signal terminal pairs being arranged into a plurality of terminal rows, the plurality of terminal rows including:

a plurality of grounding terminal rows, each of which comprises a plurality of first grounding terminals of the plurality of grounding terminals; and a plurality of hybrid terminal rows, each of which comprises a plurality of second grounding terminals of the plurality of grounding terminals and a plurality of the differential signal terminal pairs and in each of which each of the differential signal terminal pairs is located between two of the second grounding terminals, wherein each of the plurality of differential signal terminal pairs is located between two adjacent grounding terminals in one terminal row and between two other grounding terminals of two terminal rows adjacent to the one terminal row, at least two of the plurality of grounding terminals are electrically connected to each other via the electrical connection layer of the insulation base.

19. The electrical connector according to claim 18, wherein the insulation base comprises:

a bottom wall, wherein the grounding terminals and the differential signal terminals extend from a first side to a second side of the bottom wall in a first direction; and a plurality of protruding bars protruding from the second side of the bottom wall and extending in a second direction perpendicular to the first direction, wherein the grounding terminals and/or the differential signal terminals protruding from the second side of the bottom wall are held against a side wall of the respective protruding bar.

20. An electrical connector, comprising:

an insulation base including:

an electrical connection layer;

a bottom wall formed with a plurality of first through holes and a plurality of second through holes; and a plurality of protruding bars;

a plurality of grounding terminals mounted in the insulation base and extending from a first side to a second side of the bottom wall in a first direction; and a plurality of differential signal terminal pairs mounted in the insulation base and protruding from the second side of the bottom wall and extending in a second direction perpendicular to the first direction, the grounding terminals and/or the differential signal terminals protruding from the second side of the bottom wall are held against a side wall of the respective protruding bar, the side wall of the protruding bar is formed with a plurality of first recesses and a plurality of second recesses being in communication with the first through holes and the second through holes respectively, each grounding terminal is mounted in the first through hole and the first recess, and the differential signal terminal of the differential signal terminal pairs is mounted in the second through hole and the second recess, the plurality of grounding terminals and the plurality of differential signal terminal pairs being arranged into a plurality of terminal rows, wherein each of the plurality of differential signal terminal pairs is located between two adjacent grounding terminals in one terminal row and between two other grounding terminals of two terminal rows adjacent to the one terminal row, at least two of the plurality of grounding terminals are electrically connected to each other via the electrical connection layer of the insulation base.

* * * * *